United States Patent
Alexandre et al.

(10) Patent No.: US 8,825,398 B2
(45) Date of Patent: Sep. 2, 2014

(54) DEVICE FOR ASSISTING IN THE NAVIGATION OF A PERSON

(75) Inventors: Jean-Marc Alexandre, Verrieres-le-Buisson (FR); Sylvie Lamy-Perbal, Chatenay-Malabry (FR); Rodolphe Gelin, Paris (FR)

(73) Assignee: Commissariat a l'energie Atomique, Paris (FR)

( * ) Notice: Subject to any disclaimer, the term of this patent is extended or adjusted under 35 U.S.C. 154(b) by 741 days.

(21) Appl. No.: 12/673,063

(22) PCT Filed: Jun. 27, 2008

(86) PCT No.: PCT/EP2008/058237
§ 371 (c)(1),
(2), (4) Date: Jul. 30, 2010

(87) PCT Pub. No.: WO2009/007256
PCT Pub. Date: Jan. 15, 2009

(65) Prior Publication Data
US 2010/0305845 A1   Dec. 2, 2010

(30) Foreign Application Priority Data
Jul. 12, 2007   (FR) ...................................... 07 05055

(51) Int. Cl.
*G01C 21/00* (2006.01)
*G01C 21/16* (2006.01)
*A61H 3/06* (2006.01)
*G08G 1/005* (2006.01)
*G01C 21/20* (2006.01)

(52) U.S. Cl.
CPC ............ *G01C 21/206* (2013.01); *G01C 21/005* (2013.01); *A61H 3/061* (2013.01); *G08G 1/005* (2013.01); *A61H 2003/063* (2013.01)
USPC .......... 701/505; 701/527; 701/534; 701/538; 701/541

(58) Field of Classification Search
CPC .... G01C 21/005; G01C 21/206; G08G 1/005; A61H 2003/63; A61H 3/061
USPC .................. 701/201, 541, 538, 534, 527, 505
See application file for complete search history.

(56) References Cited

U.S. PATENT DOCUMENTS 5,402,340 A * 3/1995 White et al. ...................... 702/5
5,470,233 A * 11/1995 Fruchterman et al. ........ 434/112
(Continued)

OTHER PUBLICATIONS

Andrew R. Golding, et al, "Indoor Navigation Using a Diverse Set of Cheap, Wearable Sensors," Third International Symposium on Wearable Computers (ISWC'99), IEEE, Oct. 18, 1999, pp. 29-36.
(Continued)

*Primary Examiner* — Mary Cheung
*Assistant Examiner* — Frederick Brushaber
(74) *Attorney, Agent, or Firm* — Baker & Hostetler LLP

(57) ABSTRACT

The present invention relates to a device for assisting in the navigation of a person, both inside and outside a building. The device, being fitted to the person, comprises at least: a computer (41) comprising in memory a digitized map of the place (1) in which the path of the person is planned between a departure point and an arrival point, and a location software; a human-machine interface linked to the computer; a set of sensors (42) worn by the person and linked to the computer, the sensors delivering information about the movements of the person; the location software performing a processing of the signals originating from the sensors (42) and from the interface, and performing the fusion of the data provided by the digitized map and the information arising from the sensors and from the interface, and then calculating on the basis of these data the absolute location of the person on the map and correcting the position estimation errors.

4 Claims, 2 Drawing Sheets

(56) References Cited

U.S. PATENT DOCUMENTS

| | | | |
|---|---|---|---|
| 5,798,733 A * | 8/1998 | Ethridge | 342/357.34 |
| 5,828,321 A * | 10/1998 | Matsuzaki | 340/988 |
| 5,852,791 A * | 12/1998 | Sato et al. | 701/446 |
| 6,081,230 A * | 6/2000 | Hoshino et al. | 342/357.32 |
| 6,323,807 B1 * | 11/2001 | Golding et al. | 342/419 |
| 6,614,352 B2 * | 9/2003 | Pellet et al. | 340/573.1 |
| 6,618,683 B1 * | 9/2003 | Berstis et al. | 702/94 |
| 6,834,436 B2 * | 12/2004 | Townsend et al. | 33/512 |
| 6,975,941 B1 * | 12/2005 | Lau et al. | 701/491 |
| 7,210,240 B2 * | 5/2007 | Townsend et al. | 33/512 |
| 7,218,938 B1 * | 5/2007 | Lau et al. | 455/456.1 |
| 7,321,774 B1 * | 1/2008 | Lau et al. | 455/456.1 |
| 7,698,830 B2 * | 4/2010 | Townsend et al. | 33/512 |
| 7,813,892 B2 * | 10/2010 | Sugawara et al. | 702/160 |
| 7,880,610 B2 * | 2/2011 | Tanner et al. | 340/539.26 |
| 7,890,262 B2 * | 2/2011 | Judd et al. | 701/466 |
| 8,207,869 B1 * | 6/2012 | Judd et al. | 340/995.23 |
| 2003/0179133 A1 * | 9/2003 | Pepin et al. | 342/357.08 |
| 2006/0002590 A1 * | 1/2006 | Borak | 382/104 |
| 2006/0004512 A1 * | 1/2006 | Herbst et al. | 701/208 |
| 2007/0018890 A1 * | 1/2007 | Kulyukin | 342/357.14 |

OTHER PUBLICATIONS

Rommanee Jirawimut, et al., "Visual Odometer for Pedestrian Navigation," IEEE Transactions on Instrumentation and Measurement, vol. 52, No. 4, Aug. 2003, pp. 1166-1173.

Balachandran W et al: "Visual odometer for pedestrian navigation" IEEE Transactions on Instrumentation and Measurement, IEEE Service Center , Piscataway, NJ, US, vol. 52, No. 4, Aug. 1, 2003, pp. 1166-1173.

Golding A R et al: "Indoor navigation using a diverse set of cheap, wearable sensors" Wearable Computers, 1999. Digest of Papers. The Third International SY Mposium on San Francisco, CA, USA Oct. 18-19, 1999, Los Alamitos, CA, USA;IEEE Comput. Soc, US, Oct. 18, 1999), pp. 29-36.

* cited by examiner

DEVICE FOR ASSISTING IN THE NAVIGATION OF A PERSON

CROSS-REFERENCE TO RELATED APPLICATIONS

This application is a National Stage of International patent application PCT/EP2008/058237, filed on Jun. 27, 2008, which claims priority to foreign French patent application No. FR 07 05055, filed on Jul. 12, 2007, the disclosures of which are hereby incorporated by reference in their entirety.

FIELD OF THE INVENTION

The present invention relates to a device for assisting a person in his navigation, both inside and outside a building.

BACKGROUND OF THE INVENTION

In some cases, it is necessary to guide a person in his movements inside or outside a building. In particular, aid with the navigation of blind persons in public places is becoming obligatory.

The technical problem can be solved outdoors through the use of GPS signals. Numerous navigation systems exist commercially, for equipping automobiles and also hikers. Inside a building it is no longer possible to use GPS signals. The current solutions are not satisfactory. Two types of solutions exist. The solutions of a first type are based on the use of location beacons. The other solutions are based on recognition of places.

As regards beacon systems, there exist solutions established by way of experiment in public places. These systems use location posts. By integrating a large number of reference beacons and by applying the known schemes based on trilateration, triangulation or schemes based on hyperbolas, it is possible to locate an object and thereafter propose a navigation. However, these schemes demand very significant complementary equipment for buildings and therefore give rise to installation and maintenance costs which penalize these systems. For example, a solution based on RFID beacons requires that posts be set up every five meters in the underground corridors and stations of the subway, this not being financially conceivable.

In the case of systems based on recognition of places, various solutions exist, and they arise for the most part from robotics. Some use inertial units. These units include sensors of accelerometer or gyrometer type. By data fusion between these sensors, it is possible to reproduce the three-dimensional orientation of the unit. However for inertial units intended for use by the "general public", the measurements performed exhibit a significant temporal drift making absolute location impossible. Other solutions exist using vision. The location function can in these cases be ensured by the images from a camera through the use of techniques called SLAM, which stands for "Simultaneous Localization And Mapping". However, all the vision-based schemes are currently rather unreliable and they are notably sensitive to variations in the scene captured, such as for example changes in brightness, displaced objects or else different angles of view. In addition, they require a large amount of calculation. Moreover, it is necessary to provide for the use of a camera worn by the person to be located and guided, this being detrimental to the discretion of the device. Finally, other solutions use a laser. A two-dimensional laser scanner makes it possible to measure according to an angle of about 180° the distance with respect to the obstacles. The image obtained is thereafter realigned with respect to the map of the building in which the object or the person to be located is situated. This realignment makes it possible to reposition this object in the scene. This principle, now commonly used in industry, is unsuitable for the present location application. Indeed, the presence of other people, considered by the laser to be obstacles, disturbs the measurement and prevents location. Moreover, laser scanner systems are not yet sufficiently miniaturized to be easily worn and they are not discreet. Moreover, their cost is high.

An article by Y. Tadokoro, S. Takuno and Y. Shinoda "Portable Traveling Navigation System for the Blind and its Application to Traveling Training System" Proceedings of the First Joint BMES/EMBS Conference, Advancing Technology October 1999, Atlanta, page 589, describes a portable navigation system comprising a computer with the planned path for a destination in the memory, movement sensors and an audible HMI. The computer calculates the distance traveled and the direction of movement and compares them with the planned path, and the HMI gives indications to the user. However the solution described in this publication does not make it possible to correct the drifts of the calculated path with respect to the real path.

A patent application WO 2005/080917 discloses a system for determining the path followed by a pedestrian. This system comprises three inertial sensors attached to a user. It requires a calibration for each user.

SUMMARY OF THE INVENTION

An aim of the invention is to alleviate the aforementioned drawbacks, while making it possible notably to avoid the addition of complementary equipment inside buildings. For this purpose, the subject of the invention is a device for assisting in the navigation of a person, fitted to this person and comprising at least:
  a computer comprising in memory a digitized map of the place in which the path of the person is planned between a departure point and an arrival point, and a location software;
  a human-machine interface linked to the computer;
  a set of sensors worn by the person and linked to the computer, the sensors delivering information about the movements of the person;
the location software performing a processing of the signals given by the sensors and by the interface and performing the fusion of the data provided by the digital map and the information arising from the sensors worn by the person and from the interface, and then calculating on the basis of these data the relative location of the person, doing so without the use of either pre-installed places (GPS, RFID, etc.), or prior learned places.

A navigation software can then calculate for example the route to be traveled by the person on the basis of the previously calculated location and can provide the necessary information for the navigation of the person through the human-machine interface.

One sensor at least is for example an inertial unit.

The calculation of the route to be traveled is for example updated according to identified intermediate objectives of the path reached, these intermediate objectives being marked on the digital map.

The reached objective can be identified by a characteristic movement of the person, detected by at least one sensor (observed for example on the signature of the signal of a sensor).

The reached objective can also be identified by an information provided trough the interface by the person.

Advantageously, the device implements for example an iterative process according to the of the intermediate objectives to be reached along the path, the objective to be reached being defined;

in a first step the estimation of the route as well as the possible correction, of the trajectory are calculated;

in the following step, if the objective is reached a new objective to be reached is defined, if the objective is not reached a probabilistic estimation of the position is performed and then a new objective to be reached is defined.

BRIEF DESCRIPTION OF THE DRAWINGS

Other characteristics and advantages of the invention will become apparent with the following description, given in relation to appended drawings which represent:

FIG. 1 illustrates the principle of using a device according to the invention. A user indicates via a suitable human-machine interface, HMI, the position where he is situated, his departure point A, and his arrival point B. The departure point A can be entered by the user into a navigation device, either given or confirmed by a so-called RFID radiofrequency identification post (RFID), or any other means of absolute location.

Figure 1:
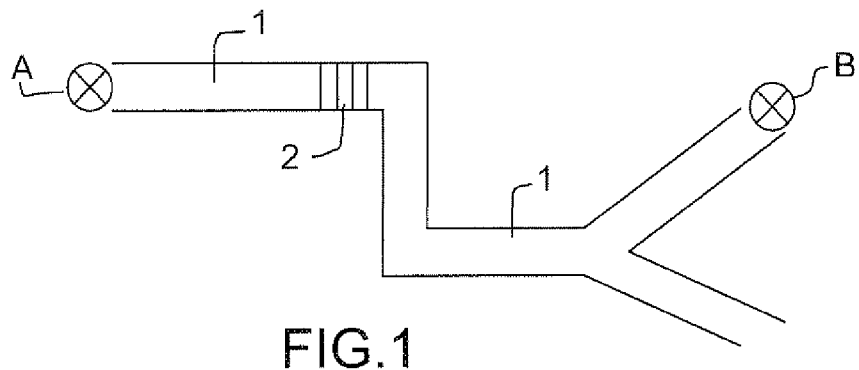
FIG. 1, an illustration of the principle of using a device according to the invention.

The corridors 1 of the subway are an example of a possible use of the invention. The user then enters the departure point A as being the entrance of the subway station which he is entering, this station entrance possibly being confirmed by an RFID post. The user moreover indicates the arrival point B, in this instance the subway station to which he wishes to go. The navigation software then calculates the route to be followed by the user. In the example of FIG. 1, the navigation software begins by searching for the subway line to be taken and marks the platform to which the person should go. It then calculates the route to be followed by the user.

The system possesses a map of places in which the user will journey. The HMI indicates to the user the directions to be followed and the key points that he will reach. It indicates for example that 200 meters from departure there will be a staircase 2 and that at the bottom of the staircase it is necessary to take a 90° turn to the right.

The system makes it possible to follow the user's journey on the map so as to indicate to him correctly the directions to follow as function of his location. For this purpose, the system implements the process illustrated by the steps of FIG. 2.

Figure 2:
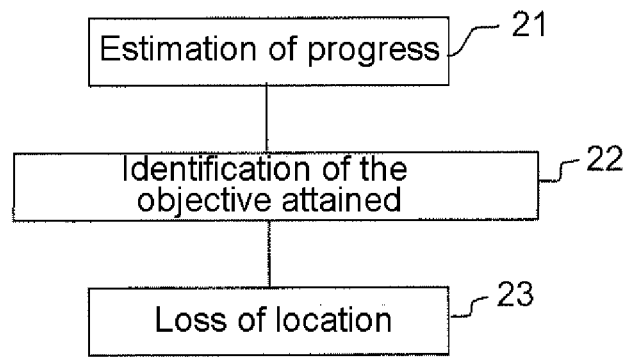
FIG. 2, a presentation of iterative steps implemented in a device according to the invention.

FIG. 2 therefore illustrates three possible steps applied by a system according to the invention. A progress estimation step 21 involves an estimation of movement in three dimensions, 3D. This estimation is obtained on the basis of sensors worn by the user, such as for example accelerometers, gyrometers, a magnetometer or else a barometer.

During the course of the user's movement, the system can, regularly or otherwise, reorient the user if it detects a drift of heading or of progress with respect to the fixed objective.

On the basis of the 3D movement estimation obtained on the basis of the sensors, the location system performs for example a realignment with respect to the map so as to remove the lateral positioning errors due to the drifting of the sensors. In particular in the example of FIG. 1, if the estimation positions the user inside a wall, the system realigns the user in the middle of the corridor 1, preserving the estimation of progress along the trajectory.

In a following step 22, the system undertakes the identification of the objective reached. The estimation of progress obtained in fact drifts over time through accumulation of error with each stride by the user. It is therefore necessary to regularly relocate the latter on a place map. The system then seeks to identify that the indicated objective has been reached. Two modes of identification can for example be used:

one mode uses the perception of the user who indicates that the objective is reached by sending an information cue, for example of the "click" type, to the navigation device;

another mode is based on the recognition of the objective on the basis of the signature of the signals originating from the sensors.

In both these cases, the navigation device gives, once the objective has been reached, a new objective to be reached. All these objectives are in fact intermediate objectives situated between the departure point A and the arrival point B. The recognition of the reaching of an objective can be done for example through a measurement of a change of heading, such as a change of corridor notably, through an estimation of going up or going down in the case of a staircase, through an identification of a movement without the person actually moving, when he is notably in a subway train or else through an indication by the person to the HMI.

Another step 23 relates to the cases of loss of location of the user. These cases of loss of location can arise in particular in extremely difficult spots where a crowd is for example present or inside very large halls.

On the basis of the latest measurements received and of data that can be provided by the user such as for example information about the presence of a corridor or gate, the system can perform a probabilistic calculation of the most probable positions, other than that defined initially and can then propose an alternative solution to attain the defined objective.

Figure 3:
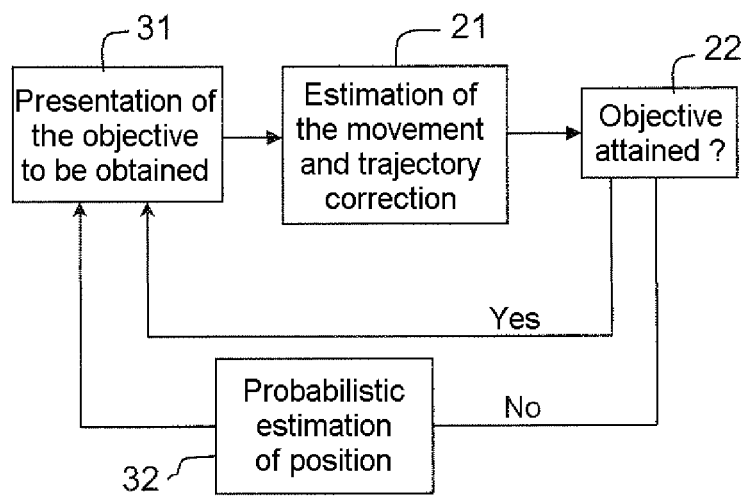
FIG. 3, an illustration of a possible progress of the aforementioned steps.

FIG. 3 illustrates a possible chaining of the previously described steps 21, 22, 23, which can follow one another according to an iterative process as a function of the renewal of the objectives to be reached the whole way along the trip. Initially 31 the objective to be reached is presented. Then in the first step 21 the system performs the estimation of the movement as well as the correction, if any, of the trajectory. In the following step 22 depending on whether the objective has or has not been reached, several actions are possible. If the objective has been reached a new objective to be reached is presented 31. If the objective has not been reached a probabilistic estimation 32 of the position is performed and then a new objective to be reached is presented.

Figure 4:
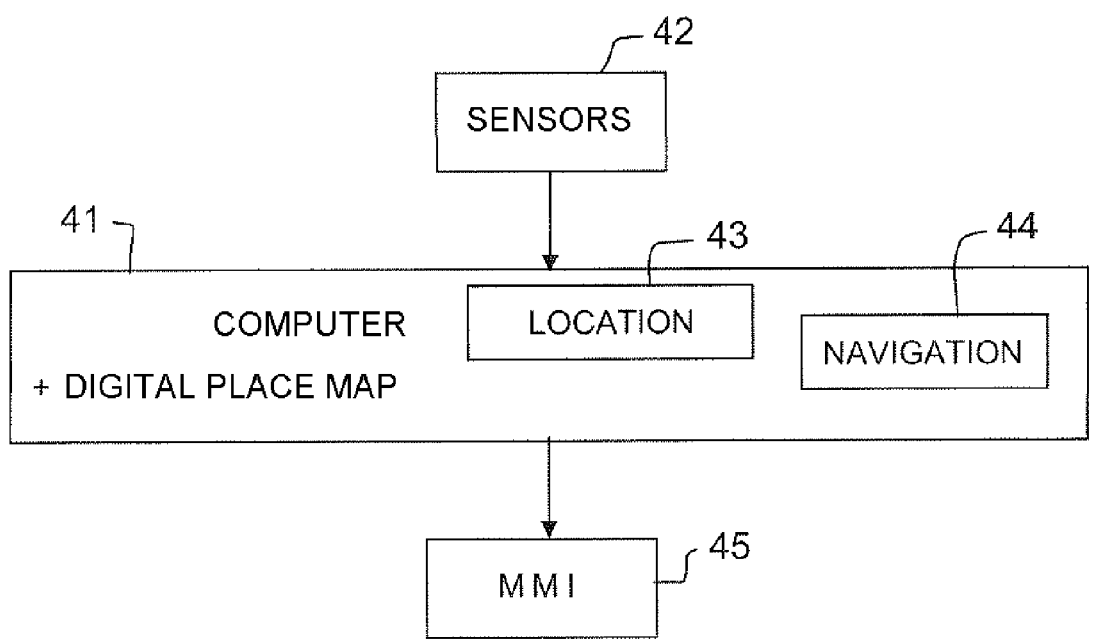
FIG. 4, a presentation of the possible main functional blocks of a device according to the invention.

FIG. 4 presents the various possible functional blocks of a system according to the invention such as described previously. The device comprises a computer 41 worn for example at the level of the user's waist and sensors 42, distributed over the user's body. Each sensor 42 can represent a set of sensors centralized at a particular spot on the body.

The computer 41 can be linked by a bidirectional link to an HMI 45 intended notably for entering input data, in particular for inputting the departure point and the arrival point, as well as for inputting intermediate markers for example. The HMI is for example also intended for presenting information as output from the computer 41 such as notably indications regarding the planned route, distances or changes of direction. This information can be delivered in audible, visual or tactile form.

The computer comprises in memory a 2D or 3D digital mapping of places, in which the user's movements are planned.

The computer moreover comprises in memory the location software comprising a system for processing the signals originating from the sensors 42, and from the HMI, as well as for example a computerized system which performs the fusion of the data between the mapping and the information arising from the sensors and from the HMI, this system calculating on the basis of these data the user's instantaneous absolute location, that is to say the user's position referenced with respect to the map. It can also comprise for example a navigation software 44 performing the planning of the route to be traveled on the basis of the arrival point and of the user's position referenced with respect to the map.

The sensors 42 are linked to the computer.

These sensors 42 can be inertial units, an inertial unit being able in this case to be the association of 3 gyrometers and of 3 accelerometers. These inertial units give acceleration and rotation speed information, but not position information. The system must therefore determine the user's position on the basis of the data provided by these sensors. The device can moreover comprise other types of sensors such as a barometer and/or a magnetometer, these sensors being situated for example in the same housing as that which comprises the computer.

To define the position of the user, simple integration of the speeds and accelerations given by the sensors is not sufficient since the position thus calculated drifts rapidly. The system therefore makes it possible to regularly realign the calculated position of the user. For this purpose, the system uses for example:

the signature of signals on reaching the key points of the path such as for example staircases or a change of direction;

the information given by the user, for example when reaching the barriers of the subway; or the detection of strides.

An HMI can be used to enter input data and to present information at output. This HMI can use sensory signals, for example audible or tactile and/or visual. The interface is chosen for example so as to comply with rules which may be important such as not masking, altering or disturbing audible, haptic, olfactory or thermal indices customarily exploited by users. The HMI must moreover preferably communicate only what is useful at the opportune moment without generating errors or lowering the level of vigilance.

As regards the mapping of places, 3D plans of the subway for example already exist and the plans of public places or buildings are relatively simple to produce in 3D, or in 2D if one limits oneself to movements on a single floor.

For the navigation operations, standard algorithms can be used.

The invention advantageously makes it possible to perform the integration in one and the same device of a set of variables originating from sensors, from the user and from a prerecorded mapping, and uses the fusion of data arising from the sensors and details given by the user with the mapping. The fusion of the data arising from the sensors is for example performed continually. The location and navigation software embedded in the system takes account of the information arising from the sensors, the information given by the user and the mapping information, and on the basis of this information it delivers the information for the route to be followed.

Advantageously, a device according to the invention does not require any complementary equipment for the buildings traversed. It is moreover discreet, easy to wear and lightweight. It is adaptable to all the places mapped beforehand. It uses miniaturized and low-cost sensors. It is particularly adapted for partially-sighted persons but it can also be used by able-bodied persons.

The invention claimed is:

1. A device configured to assist in indoor navigation of a person, said device being fitted to the person, the device comprising:

a computer comprising at least one processor and a memory, the memory storing a mapping of a place in which a path of the person is planned between a departure point and an arrival point, the departure point being entered by an absolute location, and storing a location software;

a human-machine interface linked to the computer; and a set of sensors comprising an inertial unit worn by the person and linked to the computer, the set of sensors configured to deliver information about movements of the person and the position of the person in said mapping in an indoor area, wherein the at least one processor executing the location software is configured to:

process signals originating from the set of sensors and from the human-machine interface, fuse data provided by the mapping and the information processed from the set of sensors and from the human-machine interface, calculate, based on the fused data and the information, a relative location of the person without use of prior learned places, calculate an updated path to be traveled as a function of identified attained intermediate objectives of the path between the absolute location and the arrival point, the intermediate objectives being marked on said mapping such that once a particular intermediate objective has been reached, the device provides a new intermediate objective to be attained, determine that the set of sensors has a drift, perform a realignment of the location of the person in the indoor area with respect to the mapping to remove lateral positioning errors in response to the determined drift of the set of sensors, determining a signature of a signal originating from at least one of the set of sensors, determining a movement characteristic of the person based upon the determined signature, and identifying that the particular intermediate objective is reached based upon the determined movement characteristic of the person.

2. The device as claimed in claim 1, wherein a navigation software calculates a route to be traveled by the person on the path based on the calculated location of the person, and provides information necessary for the navigation of the person based on signals originating from the human-machine interface.

3. The device as claimed in claim 1, wherein the particular intermediate objective reached is identified by an information cue provided to the human-machine interface by the person.

4. The device as claimed in claim 1, wherein the device is configured to implement an iterative process as a function of a renewal of the intermediate objectives to be reached along the entire path, the intermediate objective to be reached being defined, by:

calculating an estimation of a path of a trajectory;

if the intermediate objective is reached, defining a new intermediate objective to be reached; and if the intermediate objective is not reached, defining a probabilistic estimation, based on a history of positions of the person, of the position of the person and a new intermediate objective to be reached.

* * * * *